United States Patent [19]

Lukas et al.

[11] Patent Number: 4,997,255
[45] Date of Patent: Mar. 5, 1991

[54] OPTICAL FIBER SPLICE RETAINER AND METHOD FOR ITS USE

[75] Inventors: Helmut H. Lukas, Carleton Place; Grant K. Pacey, Stittsville; Steve J. Lischynsky, Ottawa, all of Canada

[73] Assignee: Northern Telecom Limited, Montreal, Canada

[21] Appl. No.: 447,453

[22] Filed: Dec. 7, 1989

[51] Int. Cl.$^5$ ................................................. G02B 6/38
[52] U.S. Cl. ............................... 350/96.21; 350/96.20
[58] Field of Search ................ 350/96.15, 96.20, 96.21

[56] References Cited

U.S. PATENT DOCUMENTS

| | | | |
|---|---|---|---|
| 4,629,284 | 12/1986 | Malavieille | 350/96.15 X |
| 4,730,892 | 3/1988 | Anderson et al. | 350/96.21 |

FOREIGN PATENT DOCUMENTS

| | | | |
|---|---|---|---|
| 0113348 | 9/1979 | Japan | 350/96.21 |
| 0156908 | 12/1980 | Japan | 350/96.21 |

Primary Examiner—John D. Lee
Assistant Examiner—Stephen W. Barns
Attorney, Agent, or Firm—C. W. Junkin

[57] ABSTRACT

An optical fiber splice retainer comprises a base member having a groove extending along a reference surface of the base member, resilient biasing means carried by the base member, and three gripping members which are urged by the resilient biasing means into a gripping position against the reference surface to span the groove at respective gripping locations along the groove. The gripping members are movable against the urging of the resilient biasing means away from the reference surface to permit insertion of optical fibers into the grooves. The gripping members are permitted to close on the inserted optical fibers to clamp the optical fibers in the groove with the fibers in axial alignment. A jig is provided for holding the splice retainer and for urging the gripping members away from the reference surface as required during insertion and alignment of the optical fibers.

23 Claims, 15 Drawing Sheets

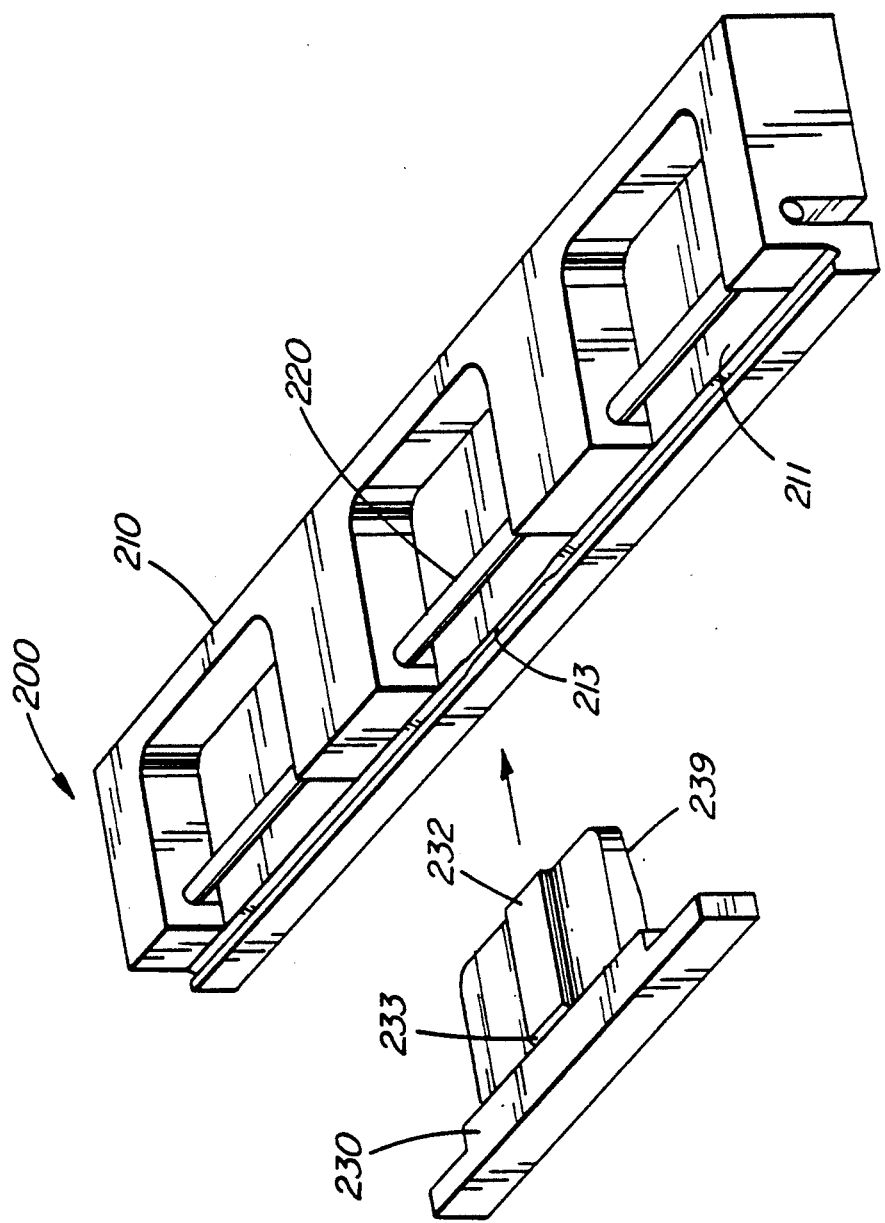

OPTICAL FIBER SPLICE RETAINER AND METHOD FOR ITS USE

FIELD OF THE INVENTION

This invention relates to optical fiber splice retainers and to methods for their use.

BACKGROUND OF THE INVENTION

Optical fibers are now commonly used as a telecommunications transmission medium. The optical fibers are packaged in protective cables, and the cables are drawn through underground ducts, ploughed into trenches or strung between poles.

For the assembly of optical fiber telecommunications systems and for maintenance and repair of such systems, optical fibers must be joined end-to-end to provide optical coupling between adjacent lengths of optical fiber. Optical fiber connectors are provided where a need for future disconnection and reconnection is anticipated. Where limited need for future disconnection and reconnection is anticipated, optical fiber splices are provided.

In one conventional method for splicing optical fibers, prepared ends of the optical fibers are brought into abutting alignment and heated by means of an electric arc or flame to cause the ends of the fibers to fuse together. While this splicing method is very effective, some field personnel are reluctant to use an electric arc or flame in underground environments in case explosive gases may be present. Moreover, the equipment which supplies the electric arc or flame is bulkier and more expensive than desired.

In other known methods for splicing optical fibers, the prepared ends of the optical fibers are brought into abutting alignment within a splice retainer and clamped or cemented within the splice retainer. For example, U.S. Pat. No. 4,730,892, which was issued Mar. 15, 1988, in the names of John C. Anderson et al., describes a splice retainer which comprises a base member, an elastomer alignment sleeve and a cover member. The base member has a v-groove which extends along a central portion of the base member. The elastomer alignment sleeve fits into the v-groove. The cover member fits onto the base member over the v-groove and, together with the base member, defines end apertures which permit insertion of prepared fiber ends between the base member and the cover member into opposite ends of the elastomer alignment sleeve. The cover member includes two barbed studs which are pressed into respective apertures of the cover member to clamp protective material surrounding the fiber ends, and a screw-driven plunger which is driven against the elastomer alignment sleeve to urge the alignment sleeve into the v-groove, thereby compressing the alignment sleeve onto the abutting fiber ends to align and clamp the fiber ends.

SUMMARY OF THE INVENTION

This invention provides novel optical fiber splice retainers which are simple to manufacture and easy to use. This invention also provides novel methods for splicing optical fibers using the novel splice retainers, and novel tools for use with the novel splice retainers.

One aspect of the invention provides an optical fiber splice retainer comprising a base member having a groove extending along a reference surface of the base member, resilient biasing means carried by the base member, and three gripping members urged by the resilient biasing means into a gripping position against the reference surface of the base member to span the groove at respective gripping locations along the groove. The gripping members are movable against the urging of the resilient biasing means away from the reference surface of the base member.

Another aspect of the invention provides a method of splicing optical fibers using the splice retainer which is defined above. In this method, a length of protective material is removed from ends of the optical fibers to be spliced to provide bare fiber ends. With the central gripping member and at least one outer gripping member urged away from the reference surface of the base member, one of the fiber ends is inserted into the groove to extend along the groove with the bare fiber end under the central gripping member and with protective material surrounding the fiber under the outer gripping member. The outer gripping member is then permitted to close on the protective material to grip the fiber end in the groove. With the other outer gripping member urged away from the reference surface of the base member, the other of the fiber ends is inserted into the groove to extend along the groove with the bare fiber end under the central gripping member, with protective material surrounding the fiber under the outer gripping member and with the fiber ends spaced from one another. The other outer gripping member is then permitted to close on the protective material to grip the other fiber end in the groove. Refractive index matching fluid is then applied to the groove between the spaced fiber ends and at least one of the fibers is moved along the groove under its respective closed gripping member to bring the fiber ends into abutment. The central gripping member is then permitted to close on the bare fiber ends to grip the bare fiber ends in the groove.

Another aspect of the invention provides a jig for use in performing the method which is defined above with the splice retainer which is defined above. The jig comprises means for retaining the base member of the splice retainer and means for individually, selectively and releasably urging each of the gripping members away from the reference surface of the base member.

BRIEF DESCRIPTION OF THE DRAWINGS

Embodiments of the invention will now be described by way of example only. Reference will be made to accompanying drawings, in which:

FIG. 6 is an exploded perspective view of a splice retainer according to a second embodiment of the invention;

DESCRIPTION OF EMBODIMENTS

Figure 1:
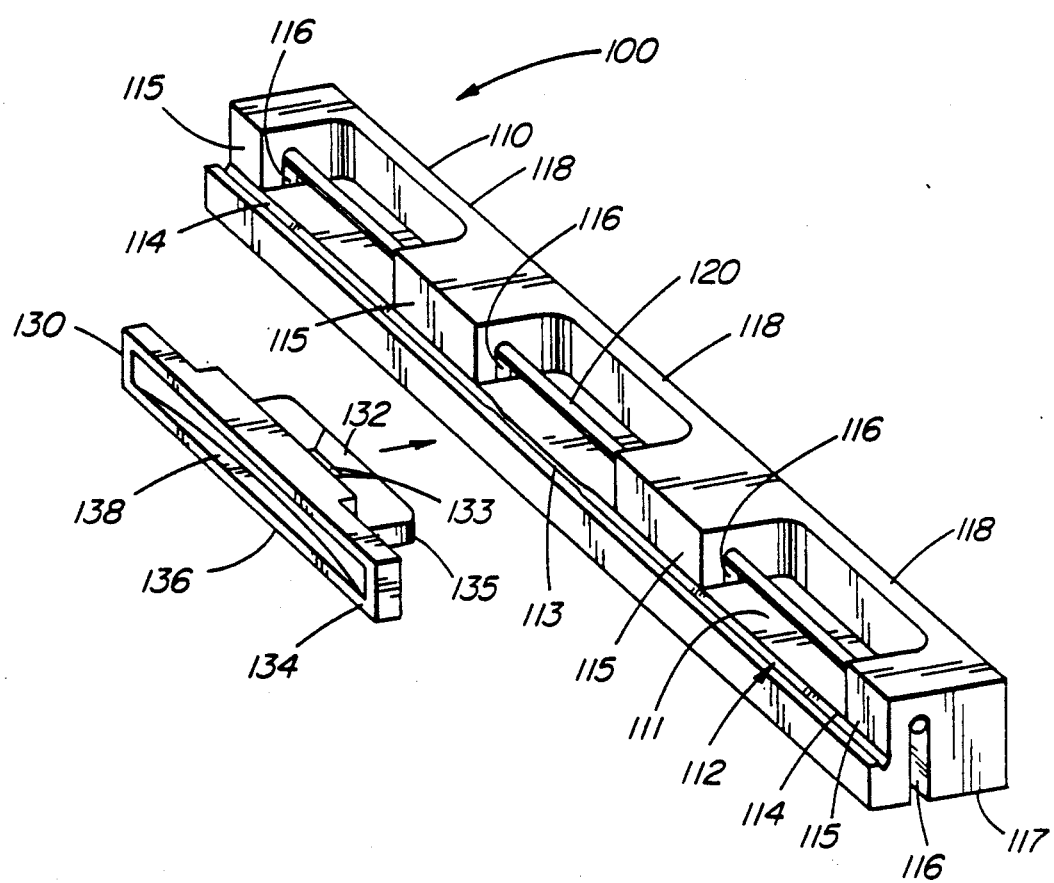
FIG. 1 is an exploded perspective view of a splice retainer according to a first embodiment of the invention.
Figure 2:
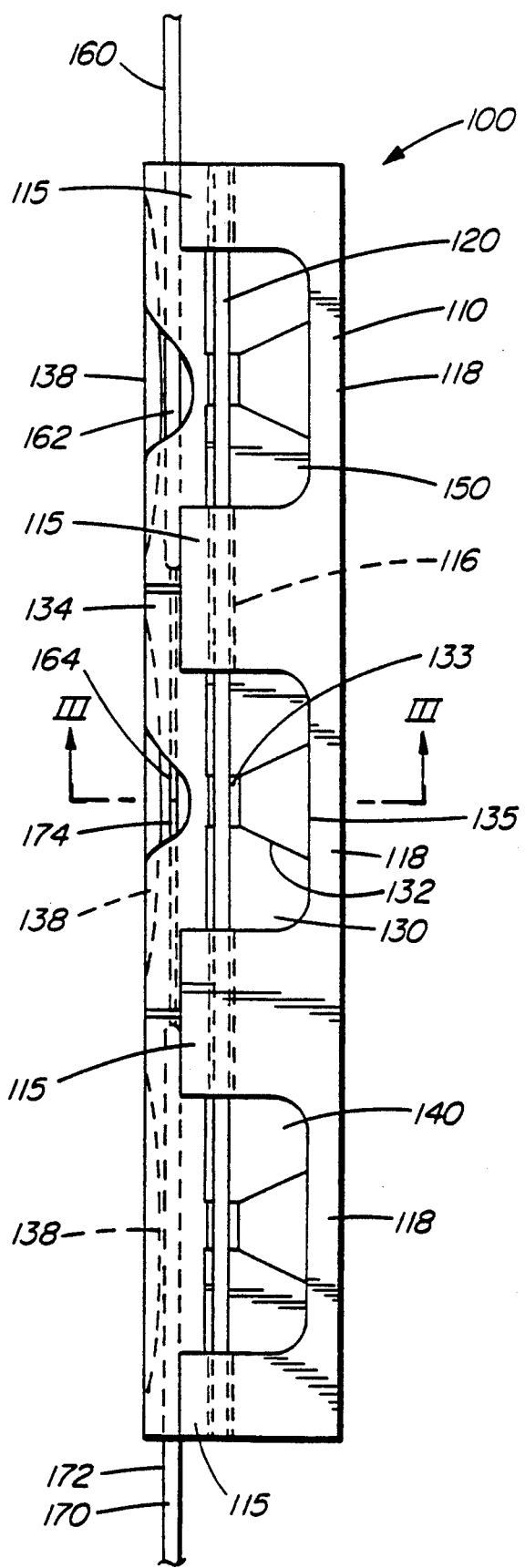
FIG. 2 is a plan view of the splice retainer of FIG. 1 shown partially cut away and with optical fibers in place.

FIG. 1 is an exploded perspective view of a splice retainer 100 according to a first embodiment. The splice retainer 100 comprises a molded plastic base member 110, a resilient member in the form of a length of resilient wire 120, and three identical molded plastic gripping members 130, 140, 150, of which only a central gripping member 130 is shown in FIG. 1. All of the gripping members 130, 140, 150 are shown in FIG. 2 which is a plan view of the splice retainer 100 with two optical fiber ends 160, 170 in place.

The base member 110 has a reference surface 111 and a v-groove 112 extending along the reference surface 111. The v-groove 112 has a central portion 113 which is dimensioned to receive a bare optical fiber, and wider and deeper end portions 114 which are dimensioned to receive an optical fiber and surrounding protective material, such as a silicone buffer.

The base member 110 has four projections 115 on the reference surface 111 adjacent to the v-groove 112. Each of the projections 115 has an opening 116 which extends through the projection 115 in a direction which is substantially parallel to the v-groove 112. The openings 116 are aligned in a direction which is substantially parallel to the v-groove 112, and extend through the reference surface 111 to a back surface 117 of the base member 110 so that the base member 110 can be molded with a simple two-part mold. The projections 115 are integral at a web 118 which is spaced laterally of the v-groove 112.

The resilient wire 120 is inserted lengthwise through the aligned openings 116 to extend between adjacent projections 115, the openings 116 receiving and locating the wire 120.

The central gripping member 130 fits between two of the adjacent projections 115 and between the wire 120 and the reference surface 111 of the base member 110. The gripping member 130 has a camming formation in the form of a sloped surface 132 which urges the wire 120 away from the reference surface 111 of the base member 110 as the gripping member 130 is inserted between the reference surface 111 and the wire 20. The sloped surface 132 terminates in a groove 133 which receives and retains the wire 120. The gripping member 130 has a flange 134 which engages the adjacent projections 115 to limit insertion of the gripping members between the reference surface 111 of the base member 110 and the wire 120.

Figure 3:
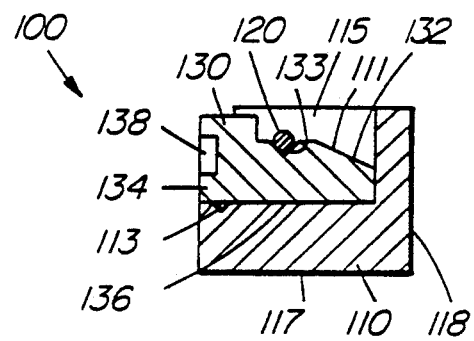
FIG. 3 is a cross-sectional view of the splice retainer and optical fibers of FIG. 2 taken along section line III—III in FIG. 2.

When the gripping member 130 is in place between the wire 120 and the reference surface 111 of the base member 110, the wire 120 resiliently biases the gripping member 130 into a gripping position against the reference surface 111 of the base member 110. In the gripping position, a gripping surface 136 of the gripping member 130 engages the reference surface 111 and spans the central portion 113 of the v-groove 112, as shown in FIG. 3.

The gripping surface 136 of the gripping member 130 is movable away from the reference surface 111 of the base member 110 by rocking the gripping member 130 on the reference surface against the urging of the wire 120. A handle formation in the form of a recess 138 in the flange 134 facilitates rocking of the gripping member 130 on the reference surface 111 as will be described in greater detail below.

The other gripping members 140, 150 are identical to the central gripping member 130 and inserted between pairs of adjacent projections and between the wire 120 and the reference surface 111 at respective positions outward of and adjacent to the central gripping member 130. The outer gripping members 140, 150 are urged into gripping positions against the reference surface 111 in which they span the wider end portions 114 of the v-groove 112. The outer gripping members 140, 150 are also movable against the urging of the wire 120 away from the reference surface 111 of the base member 110 in a rocking motion.

Figure 4:
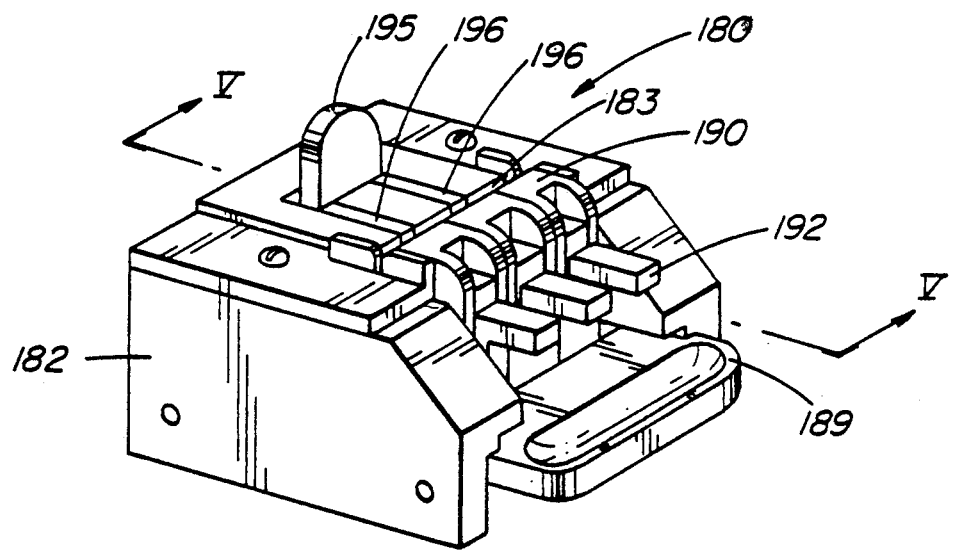
FIG. 4 is a perspective view of a jig for use with the splice retainer of FIG. 1.

FIG. 4 is a perspective view of a jig 180 for use with the splice retainer 100. FIGS. 5a–5e are cross-sectional views of the jig 180 at successive stages of its operation.

The jig 180 includes a block 182 having a groove 183 for receiving and retaining the assembled splice retainer 100. Three plungers 184 are mounted in apertures 185 which extend through the block 182 beneath the groove 183. Adjustment screws 186 determine the position of the plungers 184 in the apertures 185.

An arm member 188 and an engagement lever 189 are pivotably mounted to the block 182 with a rearward end of the engagement lever 189 contacting the arm member 188 forward of its pivot point, so that depression of a forward end of the engagement lever 189 raises the forward end of the arm member 188.

Three finger members 190 are pivotably mounted to the arm member 188. An operating lever 192 is pivotably mounted to each of the finger members 190. Each operating lever 192 has a rearward camming surface 193 which engages one of the plungers 184 when the engagement lever 189 is depressed to raise the arm member 188. In this position of the engagement lever 189, each finger member 190 may be moved forward by raising its respective operating lever 192, and may be moved rearward by depressing its respective operating lever 192.

The jig 180 also includes an ejection lever 195 which is integral with two ejection members 196 which extend forward from the ejection lever 195 between the plungers 184 to a location under the groove 183. The ejection lever 195 and ejection members 196 are pivotally mounted to the block 182 at their junction so that rearward movement of the ejection lever 195 urges the ejection members 196 upward into the groove 183.

Figure 5A:
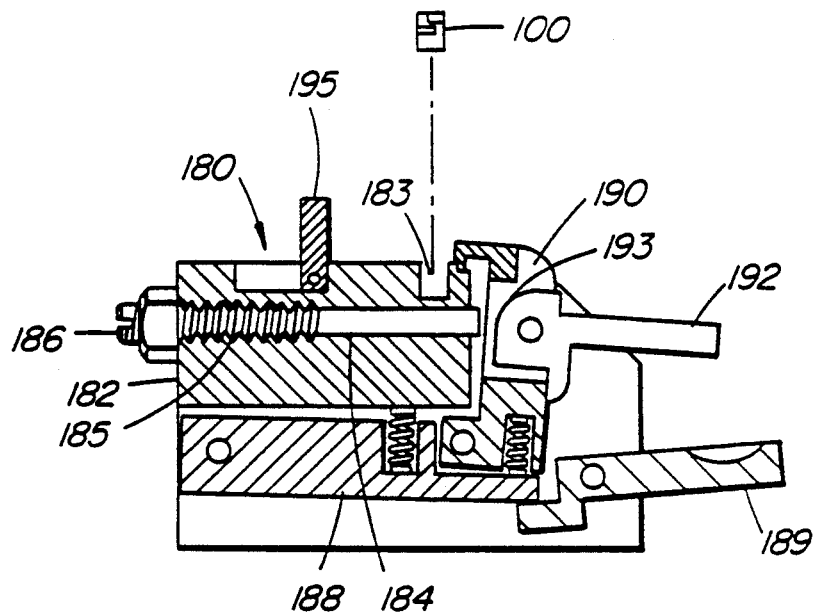
FIGS. 5a–5e are cross-sectional views of the jig of FIG. 4 and the splice retainer of FIG. 1 during successive steps in the performance of a splicing method according to an embodiment of the invention.
Figure 5B:
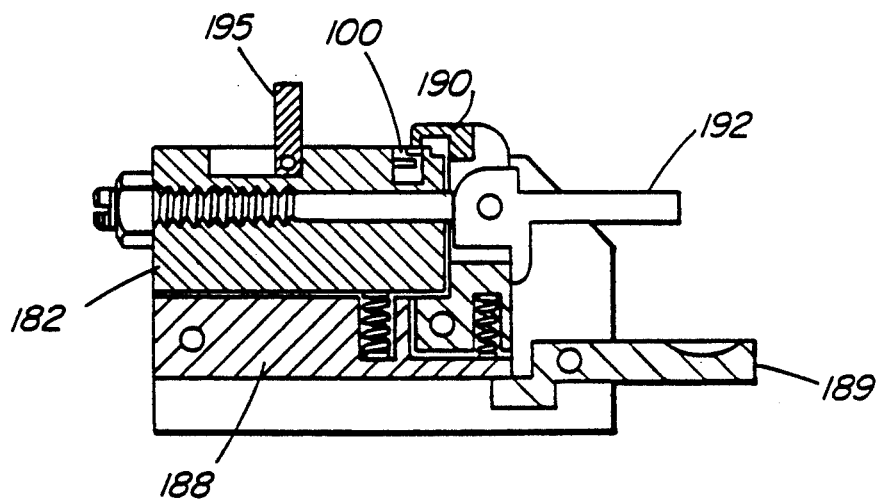
Figure 5C:
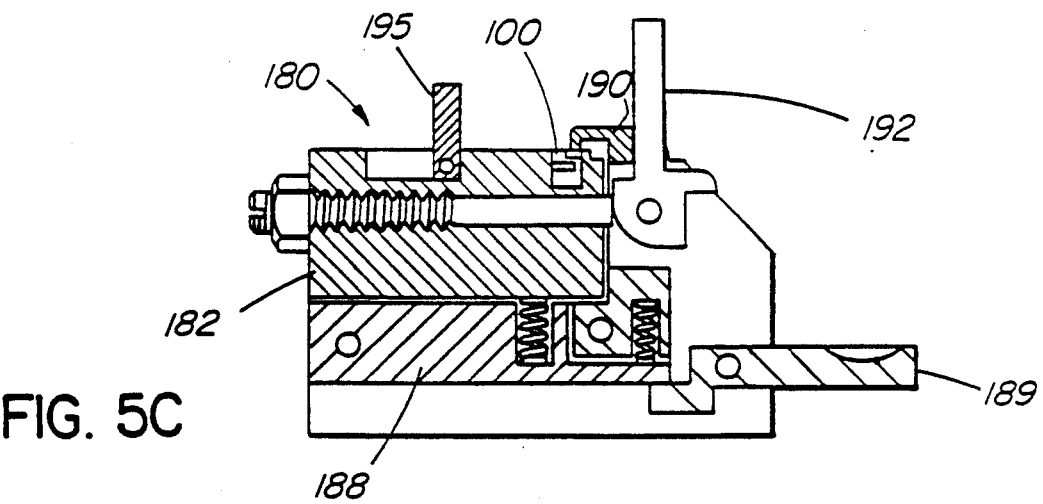

To operate the jig 180, the engagement lever 189 is raised, all three operating levers 192 are lowered, and a splice retainer 100 is dropped into the groove 183 as shown in FIG. 5a. The engagement lever 189 is then depressed to move the finger members 190 over the splice retainer 100 as shown in FIG. 5b. In this position, the finger members 190 drop into the recesses 138 of the splice retainer 100. The operating levers 192 are then raised to cam the finger members 190 forward as shown in FIG. 5c. The forward motion of the finger members 190 urges the gripping members 130, 140, 150 away from the reference surface 111 of the base member 110 to permit insertion of optical fiber ends into the V-groove 113.

Figure 5D:
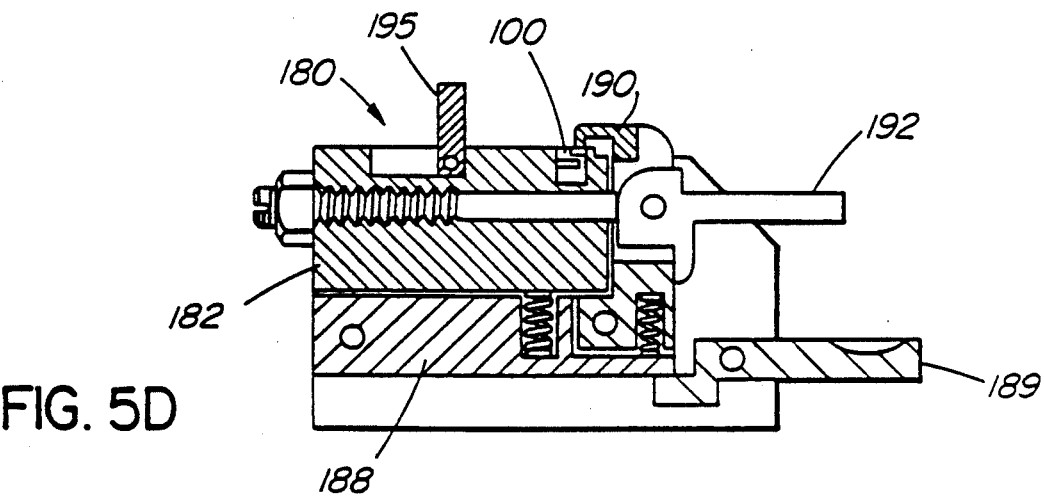
Figure 5E:
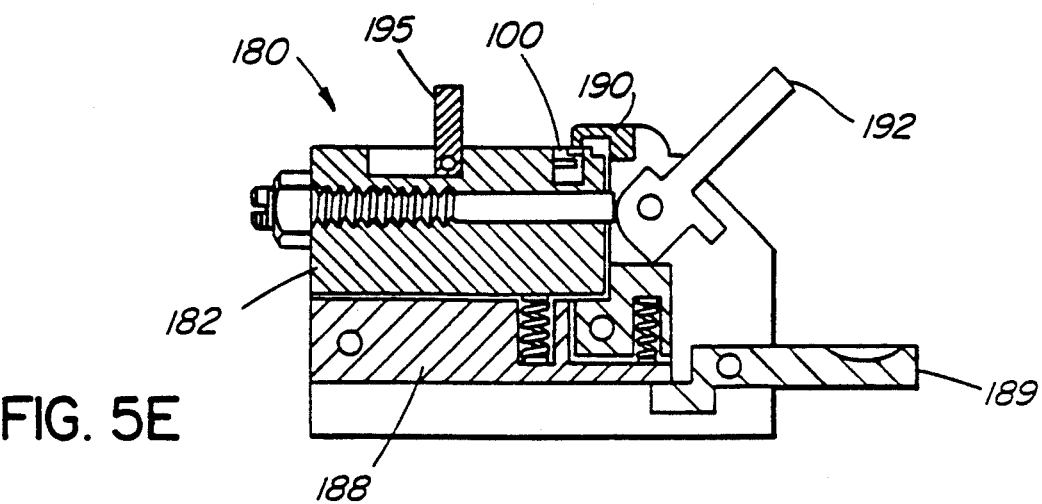

Ends 160, 170 of the optical fibers to be spliced are prepared by removing a length of protective material 162, 172 from the ends to provide bare fiber ends 164, 174. One of the fiber ends 160 is inserted into the groove 113 of the splice retainer 100 to extend along the groove 113 with the bare fiber end 164 under the central gripping member 130 and with the protective material 162 under one of the outer gripping members 150. The operating lever 192 which operates the finger member 190 engaging the outer gripping member 150 is then depressed to a gripping position as shown in FIG. 5d to permit the outer gripping member 150 to close on the protective material 162 to grip the fiber end 160 in the v-groove 112.

The other of the fiber ends 170 is then inserted into the v-groove 112 of the splice retainer 100 to extend along the v-groove 112 with the bare fiber end 174 under the central gripping member 130, with protective material 172 surrounding the fiber under the other outer gripping member 140 and with the bare fiber ends 164, 174 spaced from one another. The operating lever 192 which operates the finger member 190 engaging the other outer gripping member 140 is then depressed to the intermediate position shown in FIG. 5e to permit the other outer gripping member 140 to close on the protective material 172 to trap the fiber end 170 in the v-groove 112 while permitting sliding movement of the fiber end 170 along the v-groove 112.

Refractive index matching fluid is then applied to the v-groove 112 between the spaced bare fiber ends 164, 174 with a syringe. The operating lever 192 which operates the central gripping member 130 is depressed to the intermediate position shown in FIG. 5e so that the central gripping member 130 traps the bare fiber ends 164, 174 in the v-groove 112 while permitting sliding movement of the bare fiber ends 164, 174 along the v-groove 112. The fiber end 170 which is slidably trapped by its outer gripping member 140 is moved to bring the bare fiber ends 164, 174 into abutment under the central gripping member 130. The operating lever 192 which operates the finger member 190 engaging the central gripping member 130 is then fully depressed to the position shown in FIG. 5e to permit the central gripping member to close on the bare fiber ends 164, 174 to grip the bare fiber ends 164, 174 in the v-groove 112.

The operating lever 192 which operates the finger members 190 engaging the outer gripping member 140 is also fully depressed to permit the outer gripping members 140 to close more fully on the protective material 172 of the slidably trapped fiber end 170 to grip the protective material 172 firmly and inhibit further sliding of the protective material 172 under the gripping member 140.

The engagement lever 189 is then raised to disengage the finger members 190 from the gripping members 130, 140, 150, and the ejection lever 195 is moved rearward to move the ejection members 196 upward into the groove 183, displacing the splice retainer 100 from the groove 183 of the jig 180. The completed splice is shown in FIG. 2.

Figure 7:
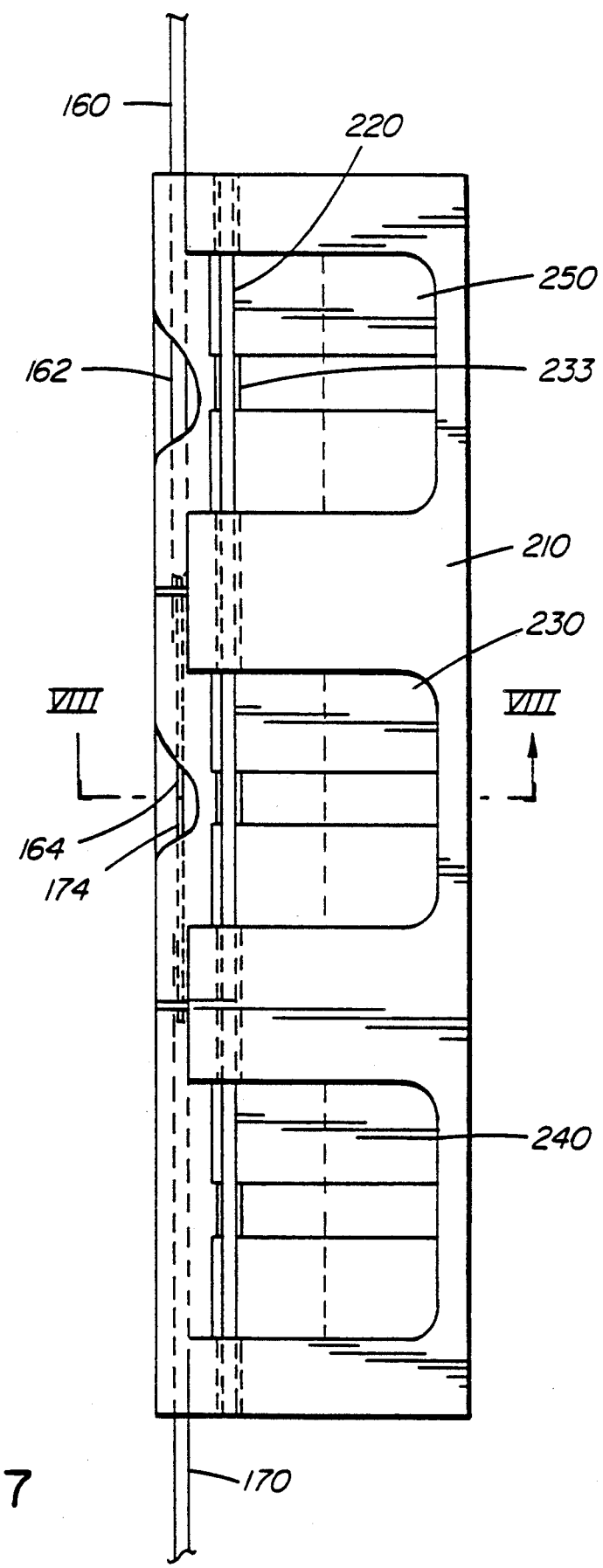
FIG. 7 is a plan view of the splice retainer of FIG. 6 shown partially cut away and with optical fibers in place.

FIG. 6 is an exploded perspective view of a splice retainer 200 according to a second embodiment. The splice retainer 200 has a base member 210 and a resilient wire 220 which are identical to the base member 110 and resilient wire 120 of the splice retainer 100 according to the first embodiment. The splice retainer 200 also has three gripping members 230, 240, 250 of which only a central gripping member 230 is shown in FIG. 6. All three of the identical gripping members 230, 240, 250 are shown in FIG. 7.

The gripping member 230 is generally similar to the gripping member 130 of the splice retainer 100 according to the first embodiment, except that the gripping member 230 has a sloped surface 239 which is laterally adjacent to the gripping surface 236. The sloped surface 239 eliminates the need for the sloped surface 132 of the gripping member 130 since it permits the gripping member 230 to be tilted during insertion of the gripping member 230 between the reference surface 211 of the base member 210 and the resilient wire 220, so that the rear surface 232 of the gripping member cams the resilient wire 220 away from the reference surface 211 during insertion of the gripping member 230. A groove 233 on the rear surface 232 of the gripping member 230 receives and retains the resilient wire 220 when the gripping member 230 is fully inserted.

Figure 8:
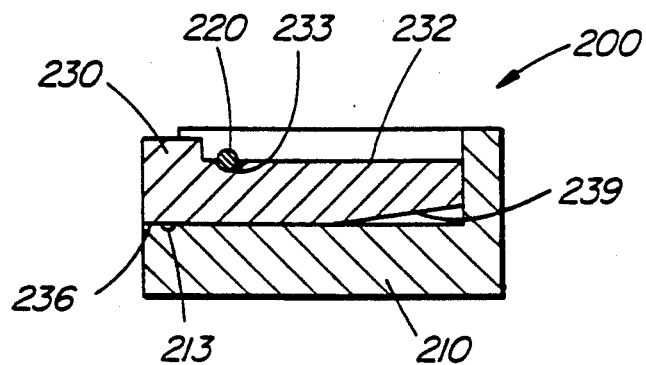
FIG. 8 is a cross-sectional view of the splice retainer and optical fibers of FIG. 7 taken along section line VIII—VIII in FIG. 7.

The sloped surface 239 also eliminates the need for the handle recesses 138 of the gripping member 130. As shown in FIG. 8, the sloped surface 239 is spaced from the reference surface 211 of the base member 210 when the gripping member 230 is in its gripping position with its gripping surface 236 against the reference surface 211 over the groove 213. Thus, the sloped surface 239 can be moved toward the reference surface 211 to rock the gripping member 230 on the reference surface 211 against the urging of the resilient wire 220, thereby urging the gripping surface 236 away from the reference surface 211 to permit insertion of optical fibers in the groove 213.

Figure 9:
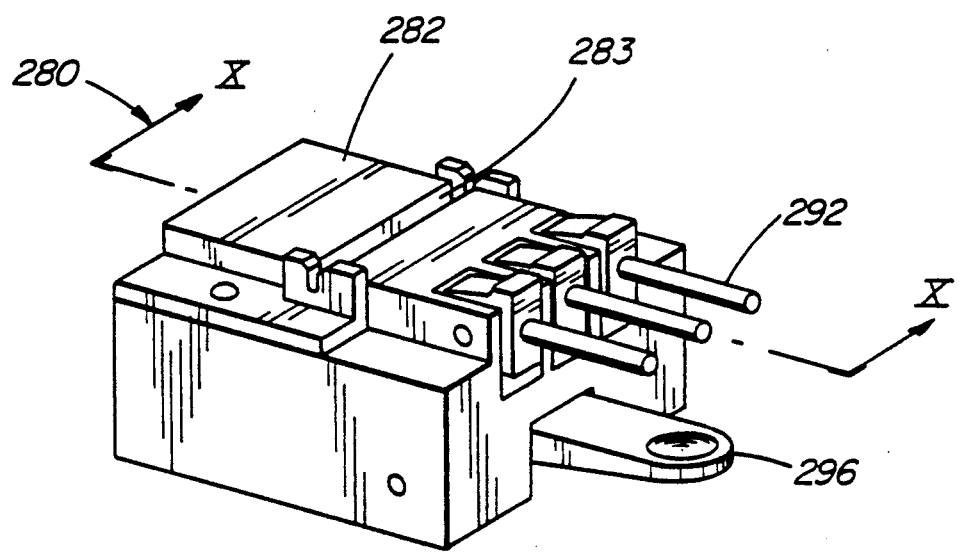
FIG. 9 is a perspective view of a jig for use with the splice retainer of FIG. 6.

FIG. 9 is a perspective view of a simplified jig 280 for use with the splice retainer 200 according to the second embodiment. FIGS. 10a–10e are cross-sectional views of the jig 280 at successive stages of its operation.

The jig 280 includes a block 282 having a groove 283 for receiving and retaining the assembled splice retainer 200. Three plungers 284 are mounted in apertures 285 which extend through the block 282 to emerge into the groove 283 at one side of the groove 283. Three operating levers 292 are pivotably mounted to the block 282. Each operating lever 292 has a camming surface 293 which engages one of the plungers 284 so that raising one of the operating levers 292 cams the corresponding plunger 284 into the groove 283, and depressing one of the operating levers 292 permits the corresponding plunger 284 to withdraw from the groove 283. Another plunger 294 is mounted in an aperture 295 which extends through the block 282 to emerge into the groove at the bottom of the groove 283. An ejection lever 296 is pivotably mounted to the block 282 and engages the plunger 294 so that depressing the ejection lever 296 pushes the plunger 294 into the groove 283, and raising the ejection lever 296 permits the plunger 294 to withdraw from the groove 283.

Figure 10A:
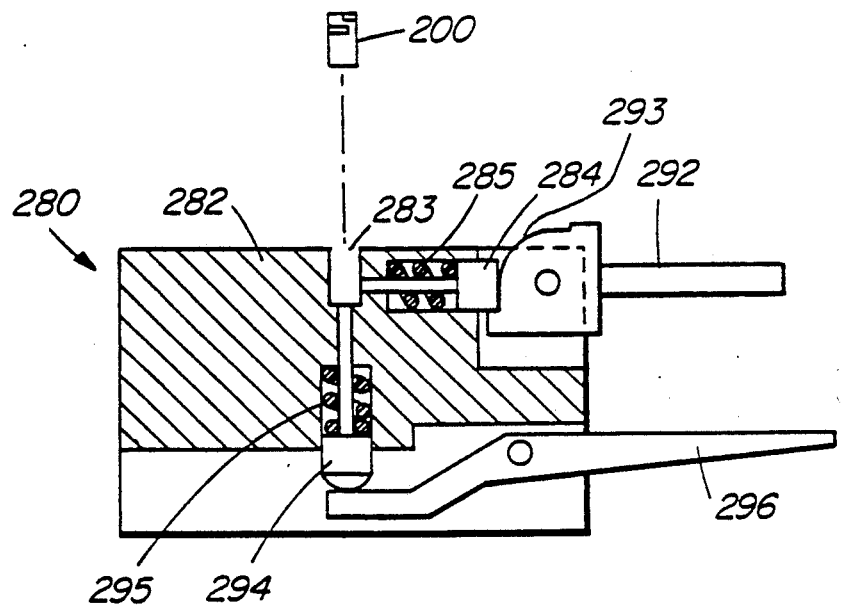
FIGS. 10a–10e are cross-sectional views of the jig of FIG. 9 and the splice retainer of FIG. 6 during successive steps in the performance of a splicing method according to an embodiment of the invention.
Figure 10B:
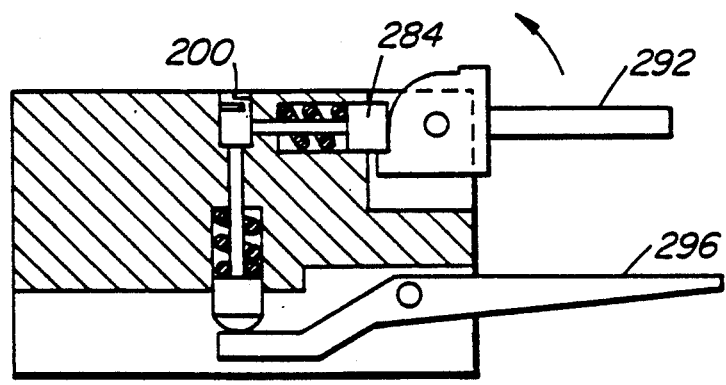
Figure 10C:
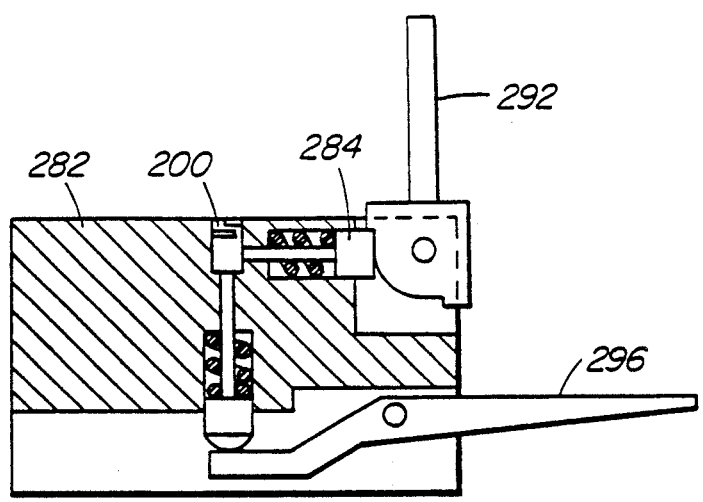

To operate the jig 280, all three operating levers 292 are depressed, the ejection lever 296 is raised, and a splice retainer 200 is inserted in the groove 283 as shown in FIG. 10a. The operating levers 292 are raised as shown in FIG. 10b to the position shown in FIG. 10c to cam the plungers 284 into the groove 283. The plungers 284 engage the gripping members 230, 240, 250 and rock the gripping members 230, 240, 250 on the reference surface 211 to permit insertion of optical fiber ends into the v-groove 213.

Figure 10D:
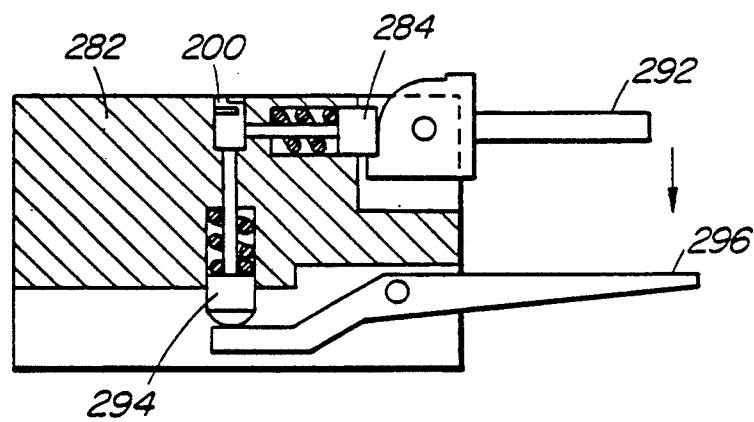
Figure 10E:
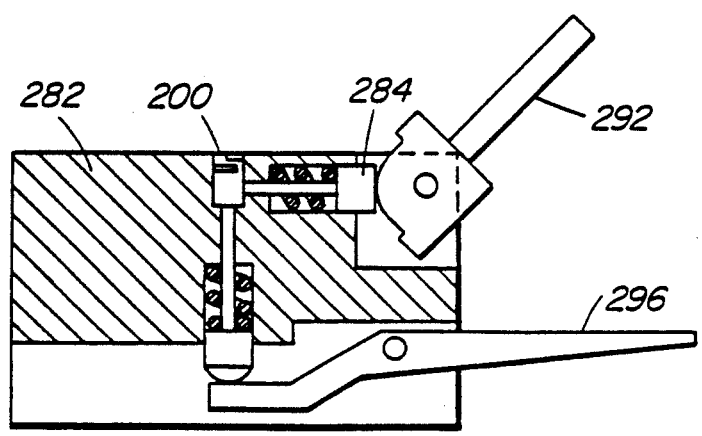

Ends 160, 170 of the optical fibers to be spliced are prepared as described above. One of the fiber ends 160 is inserted into the v-groove 213 of the splice retainer 200 and one of the operating levers 292 is depressed to a gripping position as shown in FIG. 10d to permit an outer gripping member 250 to close on protective material 162 of the fiber end 160 and grip the fiber end 160 in the v-groove 213. The other fiber end 170 is inserted into the v-groove 213 and another of the operating levers 292 is depressed to the intermediate position as shown in FIG. 10e to permit the other outer gripping member 240 to close on protective material 172 of the other fiber end 170 and trap the fiber end 170 in the v-groove 213 while permitting sliding movement of the fiber end 170 along the v-groove 213.

Refractive index matching fluid is applied to the v-groove 213 between the fiber ends 160, 170, and the slidable fiber end 170 is moved into abutment with the gripped fiber end 160 under the central gripping member 230. The operating lever 292 which operates the central gripping member 230 is fully depressed to the position shown in FIG. 10d to permit the central gripping member 230 to close on the bare fiber ends 164, 174 and grip the bare fiber ends 164, 174 in the v-groove 213. The operating lever 292 which operates the partially closed outer gripping member 240 is also depressed to permit the outer gripping member 240 to close more fully on the protective material 172 of the fiber end 170 to grip the protective material 172 firmly and inhibit further sliding of the protective material 172 under the gripping member 240.

The ejection lever 296 is then depressed to urge the plunger 294 upward into the groove 283, to eject the completed splice from the groove 283. The completed splice is shown in FIG. 7.

Figure 11:
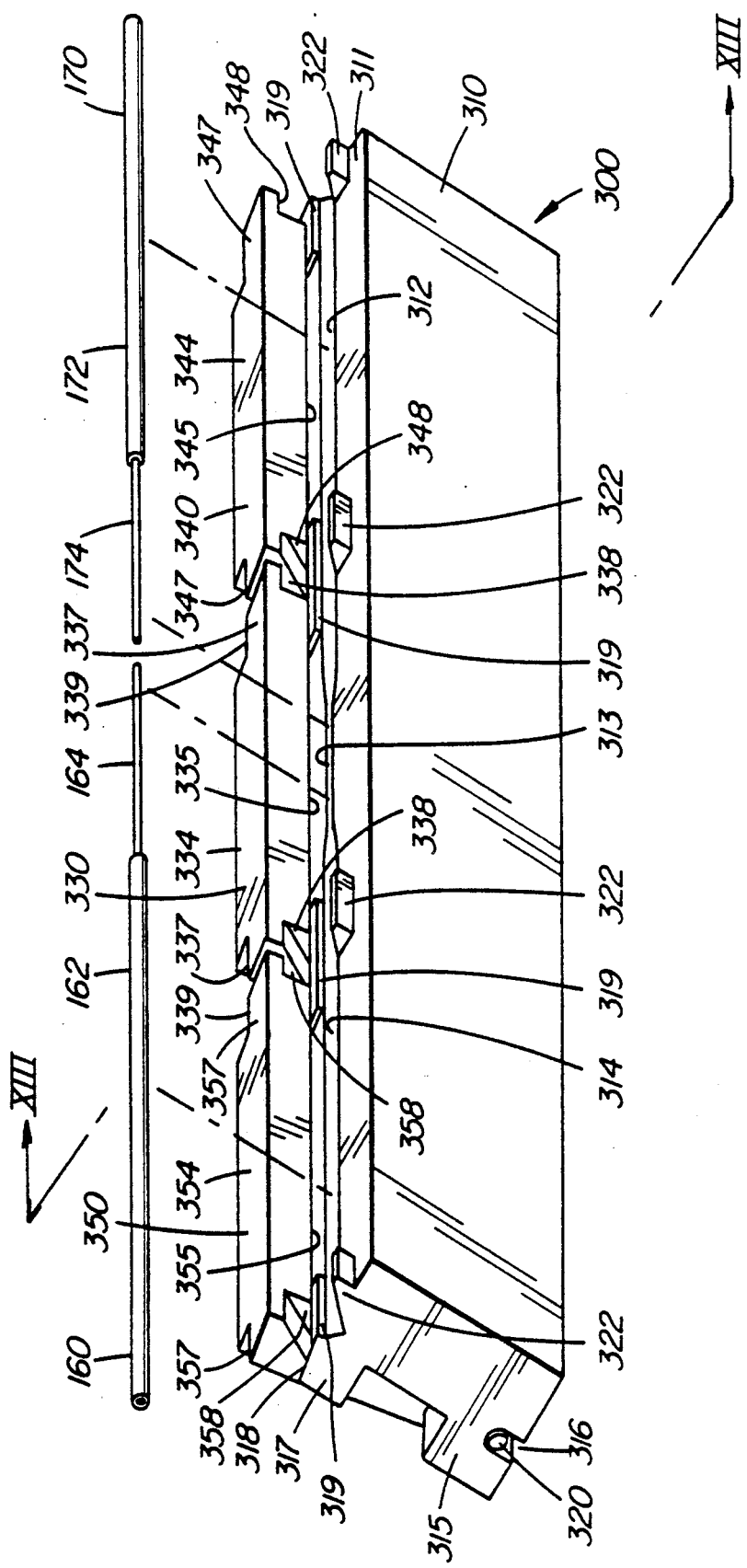
FIG. 11 is a perspective view of a splice retainer according to a third embodiment of the invention.

FIG. 11 is a perspective view of a splice retainer 300 according to a third embodiment. The splice retainer 300 comprises a molded plastic base member 310, a resilient member in the form of a length of resilient wire 320, and three identical molded plastic gripping members 330, 340, 350.

The base member 310 has a reference surface 311 and a v-groove 312 extending along the reference surface 311. The v-groove 312 has a central portion 313 which is dimensioned to receive bare optical fiber ends 164, 174, and wider and deeper end portions 314 which are dimensioned to receive an optical fiber and surrounding protective material 162, 172, such as a silicone buffer.

The base member 310 has four spaced apart, laterally extending mounting formations 315 located beneath the reference surface 311. Each mounting formation 315 has an opening 316 which extends through the mounting formation 315 beneath the v-groove 312 in a direction which is substantially parallel to the v-groove 312.

The openings 316 are aligned so that they can receive and retain the resilient wire 320.

The base member 310 also has four lateral projections 317 adjacent to the reference surface 311. Each lateral projection 317 carries a ramp formation 318 which projects above the reference surface 311 at an edge of the reference surface 311, and terminates in a step 319 adjacent the v-groove 312.

Four further projections 322 are located on the reference surface 311 opposite the ramp formations 318. These projections 322 locally extend the v-groove 312 above the reference surface 311 to facilitate accurate insertion of fiber ends 160, 10 into the v-groove 312.

Figure 12:
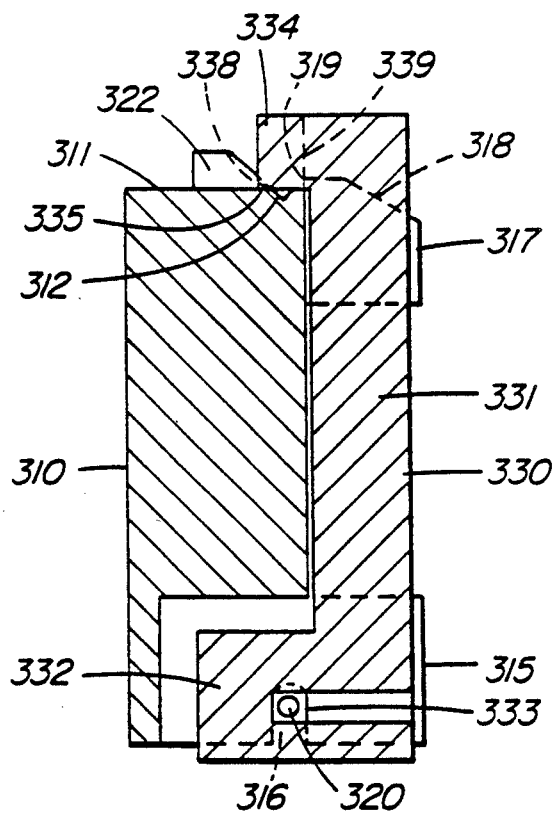
FIG. 12 is a cross-sectional view of the splice retainer of FIG. 11 shown with a gripping member of the splice retainer in a gripping position.

As shown in FIG. 12, the central gripping member 330 comprises an arm 331, a mounting formation 332, and a gripping finger 334. The mounting formation 332 is integral with the arm 331 and extends laterally of the arm 331. The mounting formation 332 has an opening 333 which extends through the mounting formation 332 for receiving and retaining the resilient wire 320. The gripping finger 334 is also integral with the arm 331 and extends laterally of the arm 331. The gripping finger 334 has a gripping surface 335 which extends laterally of the arm 331 and which faces the mounting formation 332. The outer gripping members 340, 350 are identical to the central gripping member 330.

As shown in FIG. 11, the gripping fingers 334, 344, 354 of each of the gripping members 330, 340, 350 have two lateral extensions 337, 347, 357 which extend laterally of the gripping surfaces 335, 345, 355. The lateral extensions 337, 347, 357 include recesses 338, 348, 358.

Figure 13:
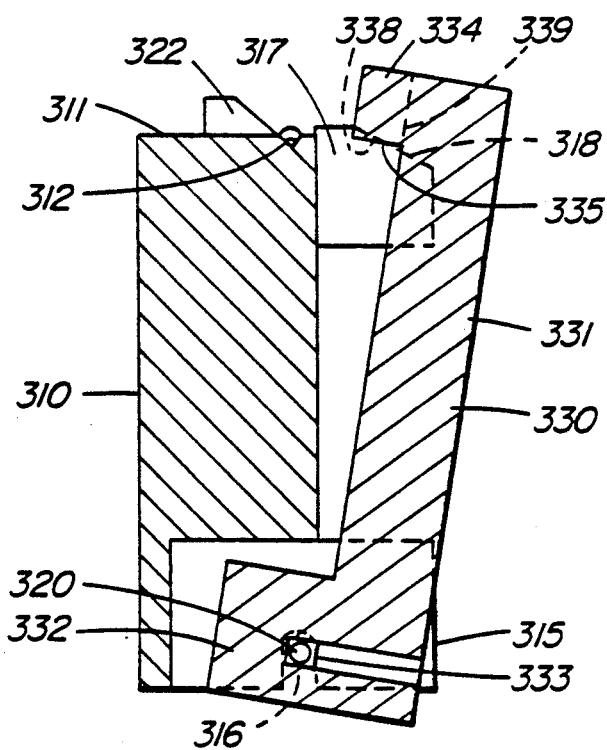
FIG. 13 is a cross-sectional view of the splice retainer of FIG. 11 shown with a gripping member of the splice retainer in an open position.

The gripping member 330 is mounted to the base member 310 by locating its mounting formations 332 between two adjacent mounting formation 315 of the base member 310 and inserting the resilient wire 320 through the openings 316, 333 of the mounting formations 315, 332. The gripping member 330 can be pivoted on the resilient wire 320 into and out of a gripping position as shown in FIGS. 12 and 13. The resilient wire 320 acts as a resilient hinge during pivoting of the gripping member 330.

In the gripping position of the gripping member 330, as shown in FIG. 12, the arm 331 of the gripping member 330 is located between two adjacent lateral projections 317 of the base member 310, the gripping surface 335 of the gripping finger 334 spans the narrow portion 313 of the v-groove 312 at a gripping location, and the projections 322 are received in the recesses 338 of the lateral extensions 337 of the gripping finger 334. The distance which separates the openings 316 of the mounting formations 315 of the base member 310 from the reference surface 311 of the base member 310 is slightly greater than the distance which separates the opening 333 of the gripping member 330 from gripping surface 335 of the gripping member 330, so the resilient wire 320 bows slightly between the mounting formations 315 of the base member 310 and resiliently biases the gripping surface 335 of the gripping member 330 against the reference surface 311 of the base member 310 in the gripping position of the gripping member 330.

In the gripping position of the gripping member 330, back surfaces 339 of the lateral extensions 337 of the gripping finger 334 engage the steps 319 of the ramp formations 318, so that the gripping surface 335 of the gripping member 330 must be urged away from the reference surface 311 against the urging of the resilient wire 320 to pivot the gripping member 330 out of its gripping position. Once the back surfaces 339 clear the steps 319, the gripping surface 335 of the gripping finger 334 engages the ramp formation 318 of the base member 310. The gripping surface 335 slides over the ramp formation during further pivoting of the gripping member 330 away from its gripping position. As this action further distorts the resilient wire 320, such pivoting is against the urging of the resilient wire 320 at least until a stable position is reached as shown in FIG. 13.

The gripping member 330 is returned to its gripping position by urging the arm 331 of the gripping member 330 toward the base member 310. The ramp formation 318 cams the gripping surface 335 of the gripping member 330 onto the reference surface 311 of the base member 310 as the gripping member 330 is pivoted into its gripping position. As the back surfaces 339 of the lateral extensions 337 of the gripping finger 334 pass over the steps 319 of the ramp formations 318, the gripping surface 335 snaps into position against the reference surface 311.

The outer gripping members 340, 350 are mounted to the member 310 at adjacent positions in the same manner, and are pivotable on the resilient wire 320 in the same manner into and out of similar gripping positions. In the gripping positions of the outer gripping members 340, 350, they span the wider portions 314 of the v-groove 312.

Figure 14:
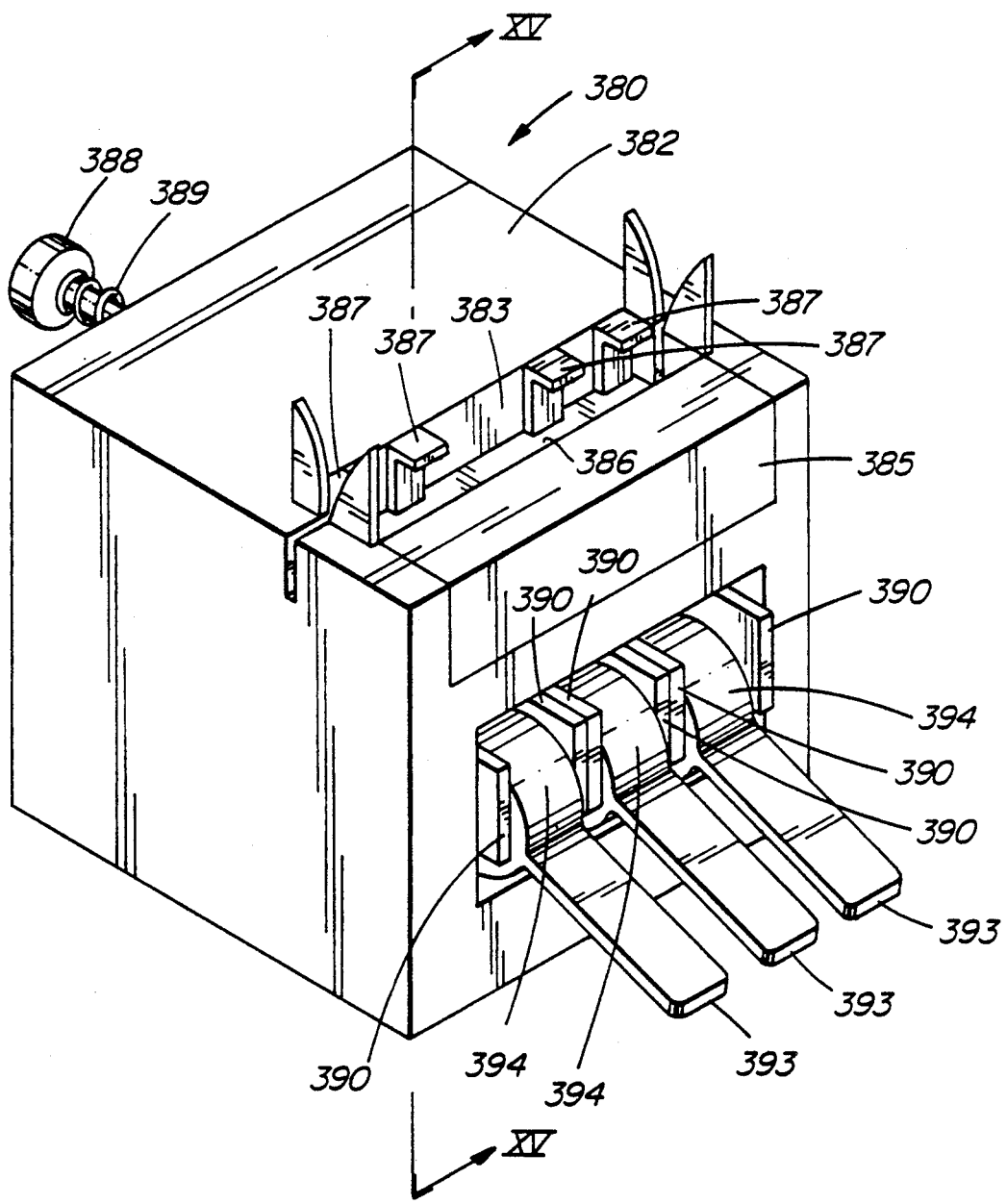
FIG. 14 is a perspective view of a jig for use with the splice retainer of FIG. 11.

FIG. 14 is a perspective view of a jig 380 for use with the splice retainer 300. FIGS. 15a–15d are cross-sectional views of the jig 380 at successive stages of its operation.

The jig 380 includes a block 382 having a recess 383 at a forward edge 384 of the block 382, and an L-shaped member 385 slidably mounted in an opening which extends rearward from the forward edge 384 through the block 382. The recess 383 and the L-shaped member 385 together define a groove 386 for receiving and retaining the splice retainer 300. Four ribs carrying lips 387 extend forward into the groove 386 from the block 382. The L-shaped member 385 carries a handle 388 and is biased rearward by a spring 389 which acts between the handle 388 and the block 382.

The jig 380 further comprises three arms 390 which are pivotably mounted in recesses 392 in the block 382 beneath the groove 386. An operating lever 393 including a cam 394 is pivotably mounted to each arm 390 to extend forward from each recess 392. Each cam 394 rides on an adjustment screw 395 which is threaded into an aperture 396 extending through the block 382 into a respective one of the recesses 392. Each cam 394 drives a spring-loaded plunger 397 mounted in an aperture 398 which extends through the block 382 from a respective one of the recesses 392 into the groove 386. The L-shaped member 385 is arranged to pass laterally of the apertures 398 and plungers 397.

Figure 15A:
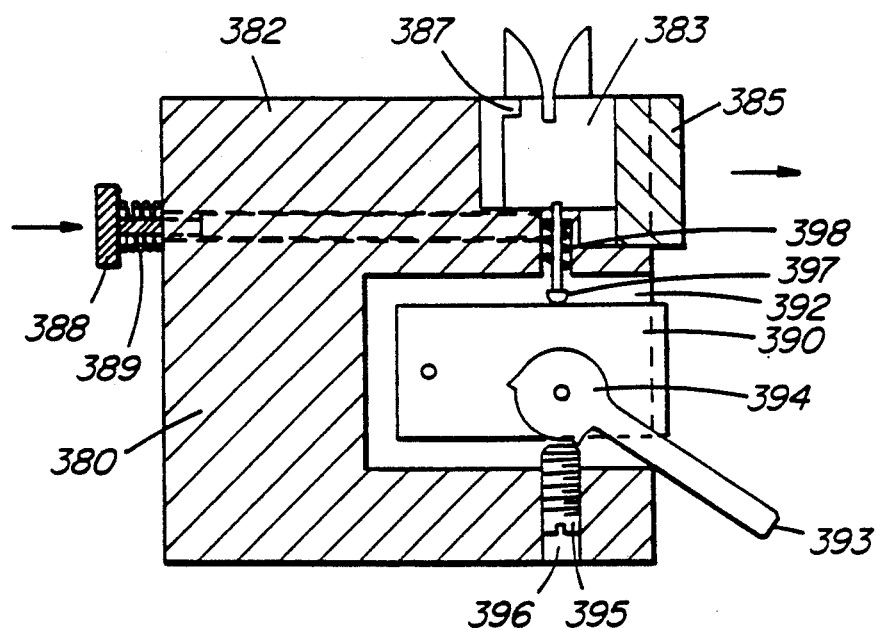
FIGS. 15a–15d are cross-sectional views of the jig of FIG. 14 and the splice retainer of FIG. 11 during successive steps in the performance of a splicing method according to an embodiment of the invention.
Figure 15B:
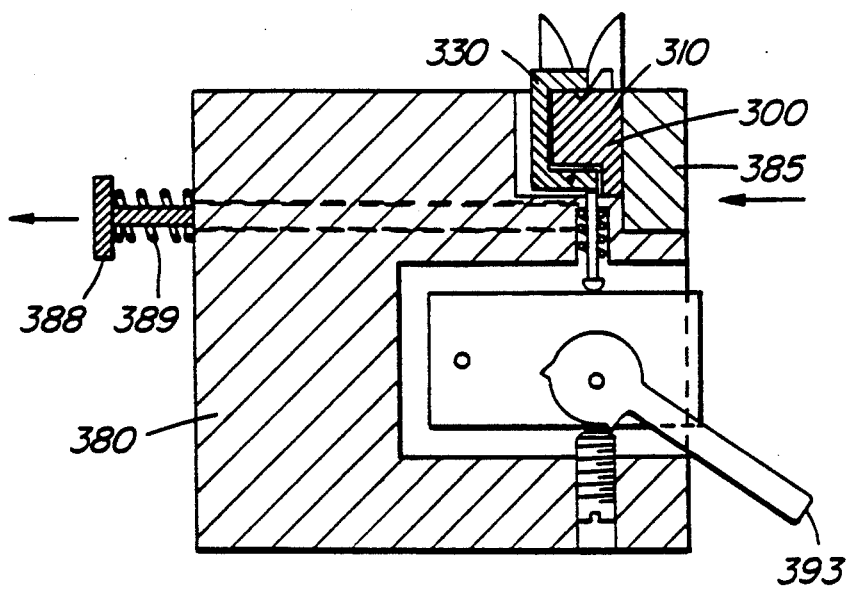
Figure 15C:
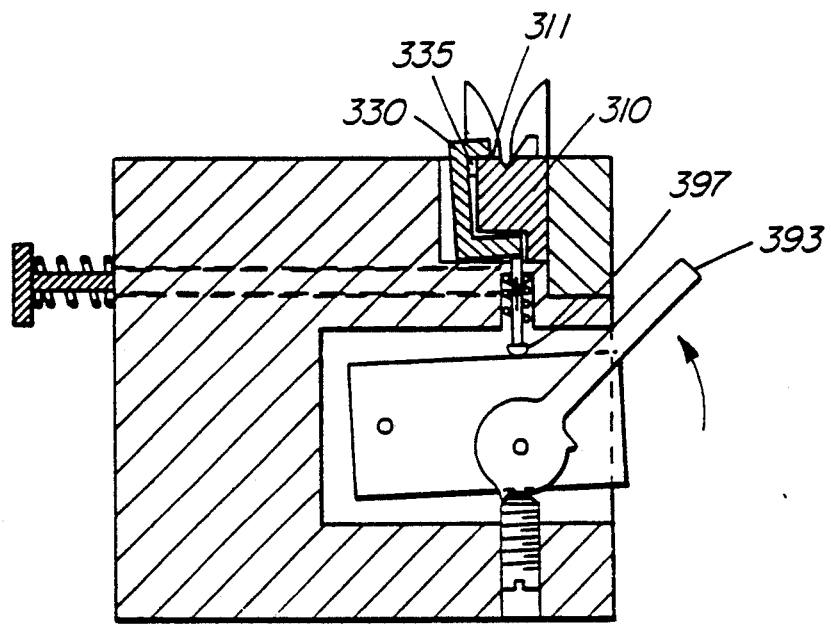

To operate the jig 380, the operating levers 393 are depressed, and the L-shaped member 385 is urged forward by its handle 388 as shown in FIG. 15a to open the groove 386. A splice retainer 300 is placed into the groove 386, and the handle 388 of the L-shaped member 385 is released so that the L-shaped member 385 moves rearward under the influence of the spring 389 to capture the splice retainer 300 under the lip 387, as shown in FIG. 15b. The operating levers 393 are raised as shown in FIG. 15c to cam the plungers 397 upward into the groove 386. As shown in FIG. 15c, the plungers 397 engage the gripping members 330 of the splice retainer 300 off-center, to urge the gripping surfaces 335 of the gripping members 330 away from the reference surface 311 of the base member 310 and to pivot the gripping members 330 out of the gripping position. In this position of the gripping members, the v-groove 312 of the base member 310 is exposed to permit insertion of optical fiber ends.

Ends 160, 170 of the optical fibers to be spliced are prepared as described above. One of the fiber ends 160 is inserted into the V-grooves 312, 313 of the splice retainer 300 with an end face of the fiber centered under the central gripping member 330 as shown in FIG. 11. The operating lever 393 which operates the outer gripping member 350 over the protective material 162 of the fiber end 160 is depressed to a gripping position as shown in FIG. 15b to close the outer gripping member 350 on the protective material 162 to grip the fiber end 160 in the v-groove 312. Depression of the operating lever 393 causes the plunger 397 to pivot the gripping member 350 against ramp formations 318 which cam the gripping surface of the gripping member onto the protective material 162 of the fiber end 160. As lateral extensions of the gripping member 350 pass over steps 319 of the ramp formations 318, the gripping surface of the gripping member 350 snaps into position against the protective material 162 of the fiber end 160.

The other fiber end 170 is inserted into the v-groove 312 with its end face spaced slightly from the end face of the gripped fiber end 160. The operating lever 393 which operates the other outer gripping member 340 is depressed to its gripping position as shown in FIG. 15b to close the outer gripping member 340 on the protective material 172 to grip the fiber end 170 in the v-groove. Depression of the operating lever 393 causes the plunger 397 to pivot the gripping member 340 against ramp formations 318 which cam the gripping surface of the gripping member 340 onto the protective material 172 of the fiber end 170. As lateral extensions of the gripping member 340 pass over steps 319 of the ramp formations 318, the gripping surface of the gripping member 340 snaps into position against the protective material 172 of the fiber end 170.

Refractive index matching fluid is applied to the v-groove 312 between the fiber ends 160, 170. The operating lever 393 which operates the central gripping member 330 is depressed to its gripping position as shown in FIG. 15b to close the central gripping member 330 on the bare fiber ends 164, 174 to grip the bare fiber ends 164, 174 in the v-groove 313. Depression of the operating lever 393 causes the plunger 397 to pivot the gripping member 330 against ramp formations 318 which cam the gripping surface 335 of the gripping member 330 onto the bare fiber ends 164, 174. As lateral extensions 337 of the gripping member 330 pass over steps 319 of the ramp formations 318, the gripping surface 335 of the gripping member 330 snaps into position against the bare fiber ends 164, 174.

Figure 15D:
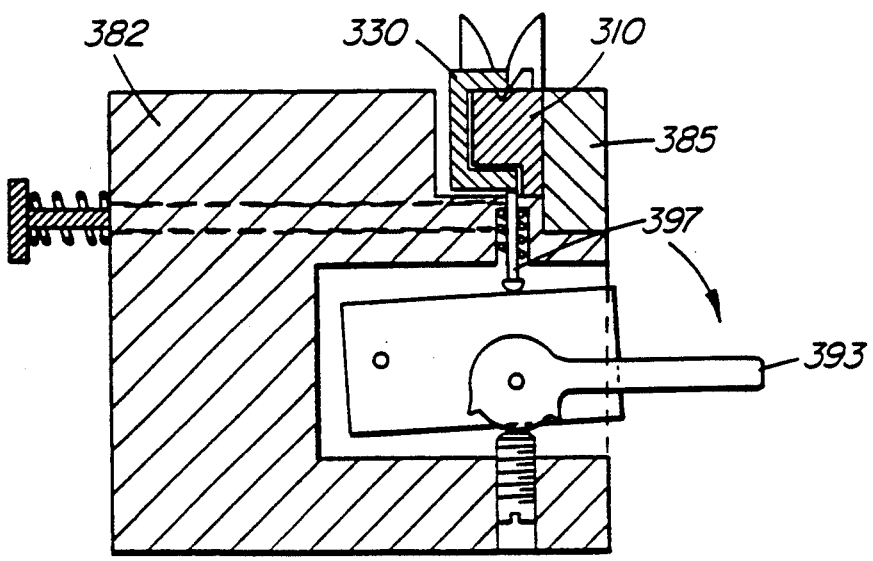

The operating levers 393 which operate the other outer gripping member 340 and the central gripping member 330 are raised to intermediate positions as shown in FIG. 15d to relax the grip on the other fiber end 170. In this position of the operating levers 393, these gripping members 330, 340 trap the fiber end 170 in the v-grooves 312, 313 while permitting the fiber end 170 to slide along the v-grooves 312, 313. The slidably trapped bare fiber end 174 is moved against the gripped fiber end 164. The operating lever 393 which operates the central gripping member 330 is fully depressed to the position shown in FIG. 15b to permit the central gripping member 330 to close on the bare fiber ends 164, 174 and grip the bare fiber ends 164, 174 in the v-groove 313. The other operating lever 393 is also fully depressed to permit the outer gripping member 340 to close more fully on the protective material 172 of the fiber end 170 to grip the protective material 172 firmly and inhibit further sliding of the protective material 172 under the gripping member 340. The L-shaped member 385 is then urged forward as shown in FIG. 15a to permit removal of the completed splice from the groove 386 of the jig 380.

In constructing each of the splice retainers 100, 200, 300 described above, it is desirable to make the base member 110, 210, 310 from a material which has a coefficient of thermal expansion which is closely matched to the coefficient of thermal expansion of the optical fibers 160, 170 to be spliced. If the base member 110, 210, 310 has a greater coefficient of thermal expansion than the fibers 160, 170, the splice retainer 100, 200, 300 will pull the spliced fiber ends 160, 170 apart when heated, and this will increase the optical loss of the splice. If the base member 110, 210, 310 has a smaller coefficient of thermal expansion than the fibers 160, 170, the splice retainer 100, 200, 300 will push the spliced fiber ends 160, 170 together when heated, and this may cause misalignment of the fiber ends 160, 170 or damage to the fiber ends 160, 170, both of which will increase the splice loss. Suitable materials for the base member 110, 210, 310 and gripping members 130, 140, 150, 230, 240, 250, 330, 340, 350 include glasses, ceramics and plastics which have coefficients of thermal expansion closely matched to that of the glass fibers 160, 170. For example, certain glass-filled and carbon-filled liquid crystal polymers are moldable materials with coefficients of thermal expansion close to the coefficient of thermal expansion for glass fibers 160, 170.

We claim:

1. A splice retainer, comprising:
   a base member having a groove extending along a reference surface of the base member and four spaced projections on the reference surface;
   resilient biasing means carried by the base member and comprising a resilient member which extends between adjacent projections; and
   three gripping members each fitting between a pair of adjacent projections and between the resilient member and the reference surface of the base member, each gripping member being urged by the resilient biasing means into a gripping position against the reference surface of the base member to span the groove at respective gripping locations along the groove, the gripping members being movable against the urging of the resilient biasing means away from the reference surface of the base member.

2. A splice retainer as defined in claim 1, wherein the projections are joined by a further projection which is spaced laterally of the groove and the resilient member.

3. A splice retainer as defined in claim 1, wherein the projections have openings therethrough for receiving and locating the resilient member.

4. A splice retainer as defined in claim 3, wherein the openings are aligned substantially parallel to the groove.

5. A splice retainer as defined in claim 4, wherein the resilient member comprises a length of resilient wire.

6. A splice retainer as defined in claim 1, wherein the gripping members have a groove for receiving and retaining the resilient member.

7. A splice retainer as defined in claim 6, wherein the gripping members have a ramp formation for urging the resilient member away from the reference surface of the base member as the gripping members are inserted between the reference surface of the base member and the resilient member.

8. A splice retainer as defined in claim 1, wherein the gripping members have a flange for engaging the projections to limit insertion of the gripping members between the reference surface of the base member and the resilient member.

9. A splice retainer as defined in claim 1, wherein the gripping members have a gripping surface which is urged by the resilient biasing means against the reference surface of the base member when the gripping member is in the gripping position, and a laterally adjacent surface which is spaced from the reference surface of the base member when the gripping member is in the gripping position, said adjacent surface being movable toward the reference surface to rock the gripping member on the reference surface against the urging of the resilient biasing means, thereby urging the gripping surface away from the reference surface.

10. A splice retainer as defined in claim 1, wherein the gripping members have a gripping surface which is urged by the resilient biasing means against the reference surface of the base member when the gripping member is in the gripping position, and a handle formation which is movable to rock the gripping member on the reference surface against the urging of the resilient biasing means, thereby urging the gripping surface away from the reference surface.

11. A splice retainer as defined in claim 1, wherein the resilient biasing means comprises resilient hinge means and the gripping members are pivotally mounted to base member by the resilient hinge means, each gripping member having a gripping surface which is urged by the resilient hinge means against the reference surface of the base member to span the groove at a respective gripping location along the groove in the gripping position of that gripping member, and each gripping member being pivotable against the urging of the resilient hinge means to move the gripping surface of that gripping member away from the reference surface of the base member.

12. A splice retainer as defined in claim 11, wherein:
   the resilient hinge means comprises a resilient wire;
   the base member has spaced apart laterally extending mounting formations located beneath the reference surface, each mounting formation having an opening extending therethrough for receiving and retaining the resilient wire; and
   each gripping member comprises an arm, a mounting formation for location between adjacent mounting formations of the base member, and a gripping finger, the mounting formation being integral with the arm, extending laterally of the arm and having an opening therethrough for receiving and retaining the resilient wire, and the gripping finger extending laterally of the arm and having a gripping surface extending laterally of the arm and facing the mounting formation.

13. A splice retainer as defined in claim 12, wherein the openings of the mounting formations of the base member are spaced from the reference surface by a first distance, the openings of the mounting formations of the gripping members are spaced from respective gripping surfaces of the gripping members by a second distance, and the second distance is smaller than the first distance.

14. A splice retainer as defined in claim 13, wherein the base member comprises a ramp formation at an edge of the reference surface for urging the gripping surface of a gripping member onto the reference surface as that gripping member is pivoted into its gripping position.

15. A splice retainer as defined in claim 14, wherein the ramp formation projects above the reference surface and terminates in a step adjacent the groove so that the gripping surface snaps into position against the reference surface when the gripping member is pivoted into its gripping position and so that the gripping surface must be urged away from the reference surface to pivot the gripping member out of its gripping position.

16. A splice retainer as defined in claim 15, wherein the base member has lateral projections adjacent to the reference surface for locating the gripping members, each lateral projection carrying a ramp formation, and the gripping finger of each gripping member has lateral extensions for engaging the ramp formation to urge the gripping surface of that gripping member onto the reference surface as that gripping member is pivoted into its gripping position.

17. A splice retainer as defined in claim 16 wherein the base member has projections on the reference surface opposite the ramp formations which locally extend the groove above the reference surface, and the lateral extensions of the gripping fingers of the gripping members have recesses for receiving these projections when the gripping members are pivoted into their gripping positions.

18. A method of splicing optical fibers, comprising:
removing a length of protective material from ends of the optical fibers to be spliced to provide bare fiber ends;
providing an optical fiber splice retainer comprising a base member having a groove extending along a reference surface of the base member, resilient biasing means carried by the base member, and a central gripping member and first and second outer gripping members urged by the resilient biasing means into gripping positions against the reference surface of the base member to span the groove at respective positions along the groove, the gripping members being movable against the urging of the resilient biasing means away from the reference surface of the base member;
with the central gripping member and at least the first outer gripping member urged away from the reference surface of the base member, inserting a first of the fiber ends into the groove to extend along the groove with the bare fiber end under the central gripping member and with protective material surrounding the fiber under the first outer gripping member;
permitting the first outer gripping member to close firmly on the protective material to grip the first fiber end in the groove;
with the second outer gripping member urged away from the reference surface of the base member, inserting a second of the fiber ends into the groove to extend along the groove with the bare fiber end under the central gripping member, with protective material surrounding the fiber under the second outer gripping member and with the fiber ends spaced from one another;
permitting the second outer gripping member to close partially on the protective material to trap the second fiber end in the groove;
applying refractive index matching fluid to the groove between the spaced fiber ends;
moving the second fiber end along the groove under the second gripping member to bring the fiber ends into abutment;
permitting the central gripping member to close on the bare fiber ends to grip the bare fiber ends in the groove; and
permitting the second outer gripping member to close firmly on the protective material to grip the second fiber end in the groove.

19. A method as defined in claim 18, wherein at least one outer gripping member is permitted to close partially on the protective material to grip a fiber end loosely in the groove before moving that fiber end along the groove under the partially closed gripping member, and that outer gripping member is permitted to close fully on the protective material to grip the fiber end firmly in the groove after moving that fiber end along the groove.

20. A method as defined in claim 18, comprising:
providing a jig comprising means for retaining the base member of the splice retainer and means for releasably urging each of the gripping members away from the reference surface of the base member;
inserting the splice retainer in the jig and urging each of the gripping members away from the reference surface of the base member;
inserting the fiber ends, inserting the index matching fluid and permitting the gripping members to close on the fiber ends with the splice retainer in the jig; and
removing the splice retainer from the jig.

21. A method as defined in claim 20, wherein the jig further comprises means for ejecting the splice retainer, and the splice retainer is removed from the splice retainer by operation of the ejection means.

22. A jig for use with a splice retainer comprising a base member having a groove extending along a reference surface of the base member, resilient biasing means carried by the base member, and a central gripping member and two outer gripping members urged by the resilient biasing means into gripping positions against the reference surface of the base member to span the groove at respective positions along the groove, the gripping members being movable against the urging of the resilient biasing means away from the reference surface of the base member, the jig comprising means for retaining the base member of the splice retainer and means for individually, selectively and releasably urging each of the gripping members away from the reference surface of the base member.

23. A jig as defined in claim 22, further comprising ejection means for ejecting the splice retainer from the jig.

* * * * *